(12) United States Patent
Aoyagi et al.

(10) Patent No.: US 6,603,285 B2
(45) Date of Patent: Aug. 5, 2003

(54) POWER CIRCUIT, POWER SUPPLY METHOD, AND ELECTRONIC DEVICE

(75) Inventors: Koji Aoyagi, Kanagawa (JP);
Kuniharu Onozuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 118 days.

(21) Appl. No.: 09/955,256

(22) Filed: Sep. 18, 2001

(65) Prior Publication Data

US 2002/0036479 A1 Mar. 28, 2002

(30) Foreign Application Priority Data

Sep. 22, 2000 (JP) ............................ P2000-289350

(51) Int. Cl.$^7$ .............................. H02J 7/00; H02H 3/20
(52) U.S. Cl. ............................ 320/134; 361/90
(58) Field of Search ............................ 320/134, 136, 320/163, 164, 116, 118; 429/7, 61, 62, 97, 99, 112; 361/90, 91.1, 91.2

(56) References Cited

U.S. PATENT DOCUMENTS 5,896,025 A * 4/1999 Yamaguchi et al. ........ 320/134
5,982,144 A * 11/1999 Johnson et al. ............. 361/56

* cited by examiner

*Primary Examiner*—Edward H. Tso
*Assistant Examiner*—Pia Tibbits
(74) *Attorney, Agent, or Firm*—Reed Smith Crosby Heafey LLP

(57) ABSTRACT

A power circuit is provided so that a charge can be normally driven even during replacement of a first battery. This power circuit comprises: first and second batteries for driving a charge; a first battery voltage detection means; a first switch for controlling a second battery power supply path based on an output of the voltage detection means; an overcharge prevention means for preventing an overcharge for the secondary battery caused by the first battery; and a switch controlled by an output of the overcharge prevention means.

22 Claims, 3 Drawing Sheets

POWER CIRCUIT, POWER SUPPLY METHOD, AND ELECTRONIC DEVICE

BACKGROUND OF THE INVENTION

1. Field of the Invention

The present invention relates to a power circuit applicable to a hand held electronic device that employs a battery as a drive power. In detail, when a built-in battery and an external battery are used, and a voltage of the external battery is set to a predetermined voltage or more, a charge is driven by a voltage of the external battery. In addition, when the voltage of the external battery is lowered to the predetermined voltage or less, an arrangement is provided so as to drive a charge by means of the built-in battery. In this manner, an external battery can be replaced with the replacement battery without instantaneously interrupting an operation state of an electronic device.

2. Description of the Related Art

As an electronic device for battery driving, there is particularly known a hand held electronic device such as hand held telephone set, a notebook type personal computer (note PC), digital camera, digital video camera, or game device.

In such a hand held electronic device, there are many cases in which an external battery using a primary battery or a secondary battery or the like is used as a drive power supply, and a buffer amplifier battery (built-in battery) for preventing erasure of the contents of the built-in memory is incorporated.

In the meantime, in such an electronic device, when an external battery is used as a power supply, namely, during operation of the electronic device, there may occur a circumference in which a voltage of the external battery is lowered, and this battery must be replaced with the replacement battery.

In order to replace a battery, it is required to remove an external battery in use from an electronic device. At this time, a power supply to the electronic device is interrupted. If power supply is interrupted, even an electronic device in operation stops its operation. Therefore, even after battery replacement, when an attempt is made to continue the current operation mode, it is required to initiate the operation mode again.

In a notebook type personal computer or the like, if a power voltage is lowered to a certain voltage, its operation state is automatically written in a memory means such as a hard disk. Thus, information written after battery replacement is read out, thereby making it possible to restore the current mode to its original operation state.

However, in this case as well, for example, when communication is made using a public telephone line, for example, the public telephone line is cut off by removing the battery and turning OFF the power. Therefore, in this case, it is required to carry out line connection processing again.

The buffer amplifier built-in battery is available for use in a battery amplifier for the built-in memory, and does not function as a load drive battery when an external battery is removed.

In order to extend a time for using an external battery, although a battery having its large battery capacity may be used, such a battery is large in size, and is heavy in weight. Therefore, it is not advisable that such a battery with its large capacity is used as an external battery for a hand held electronic device.

SUMMARY OF THE INVENTION

The present invention has been made to solve such conventional problems. In particular, it proposes a power circuit, a power supply method, and an electronic device comprising the power circuit in which a build-in battery is used as charge driving during replacement of an external battery, thereby keeping continuity of an operation state even during replacement of the external battery.

In order to solve the above described problems, a power circuit according to the present invention comprises:

a first battery for driving a charge;

a second battery for driving the charge in place of the first battery;

a voltage detection means for detecting a terminal voltage of the first battery;

a first switch for controlling a power supply path of the second battery based on an output of the voltage detection means;

an overcharge prevention means for preventing an overcharge for the second battery caused by the first battery; and a second switch connected to a charge path for the second battery and controlled by the output of the overcharge prevention means, the power circuit being characterized in that, when the first battery is lowered to a predetermined voltage or less, the charge is driven by means of the second battery.

In the present invention, an external battery (first battery) and a built-in battery (second battery) are provided. When external battery replacement caused by lowering of a terminal voltage, the built-in battery is used as a charge drive power supply.

By doing this, a charge continues its drive state by means of the built-in battery. Thus, even while an external battery is removed, a device can be used. Therefore, when communication is made by connecting a terminal device such as personal computer to a public telephone line, even if external battery replacement is required, such replacement work can be executed while communication is continued.

In order to solve the foregoing problems, a power supply method according to the present invention comprises:

a voltage detection step of detecting a terminal voltage of a first battery for driving a charge;

a step of controlling a first switch connected to a power supply path of a second battery for driving the charge in place of the first battery based on the result of the voltage detection step;

an overcharge prevention step of preventing an overcharge for the second battery caused by the first battery; and a step of controlling a second switch for preventing an overcharge connected to a charge path for the second battery based on the result of the overcharge preventing step, said power supply method characterized in that, when the first battery is lowered to a predetermined voltage or less, the charge is driven by the second battery.

As has been described above, it is possible to permanently use a hand held device by using such a power supply method.

BRIEF DESCRIPTION OF THE DRAWINGS

FIG. 1 is a connection diagram when a power circuit according to the present invention is applied to a power circuit of a notebook type personal computer, and is a view showing an operation state when power is turned ON;

DESCRIPTION OF THE PREFERRED EMBODIMENT

Now, one embodiment when a power circuit according to the present invention is applied to a terminal device such as personal computer will be described below in detail with reference to the accompanying drawings.

Figure 1:
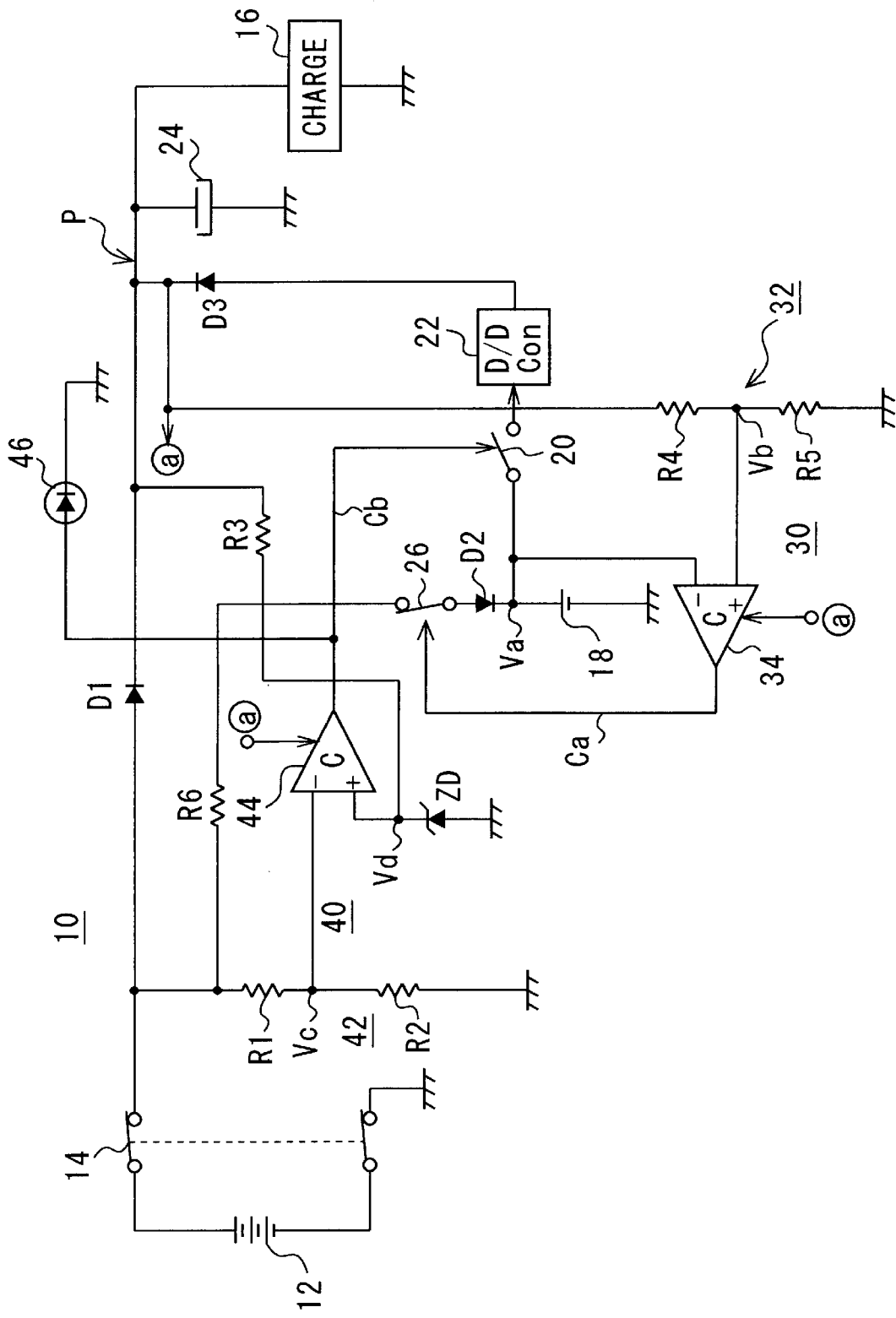
Figure 2:
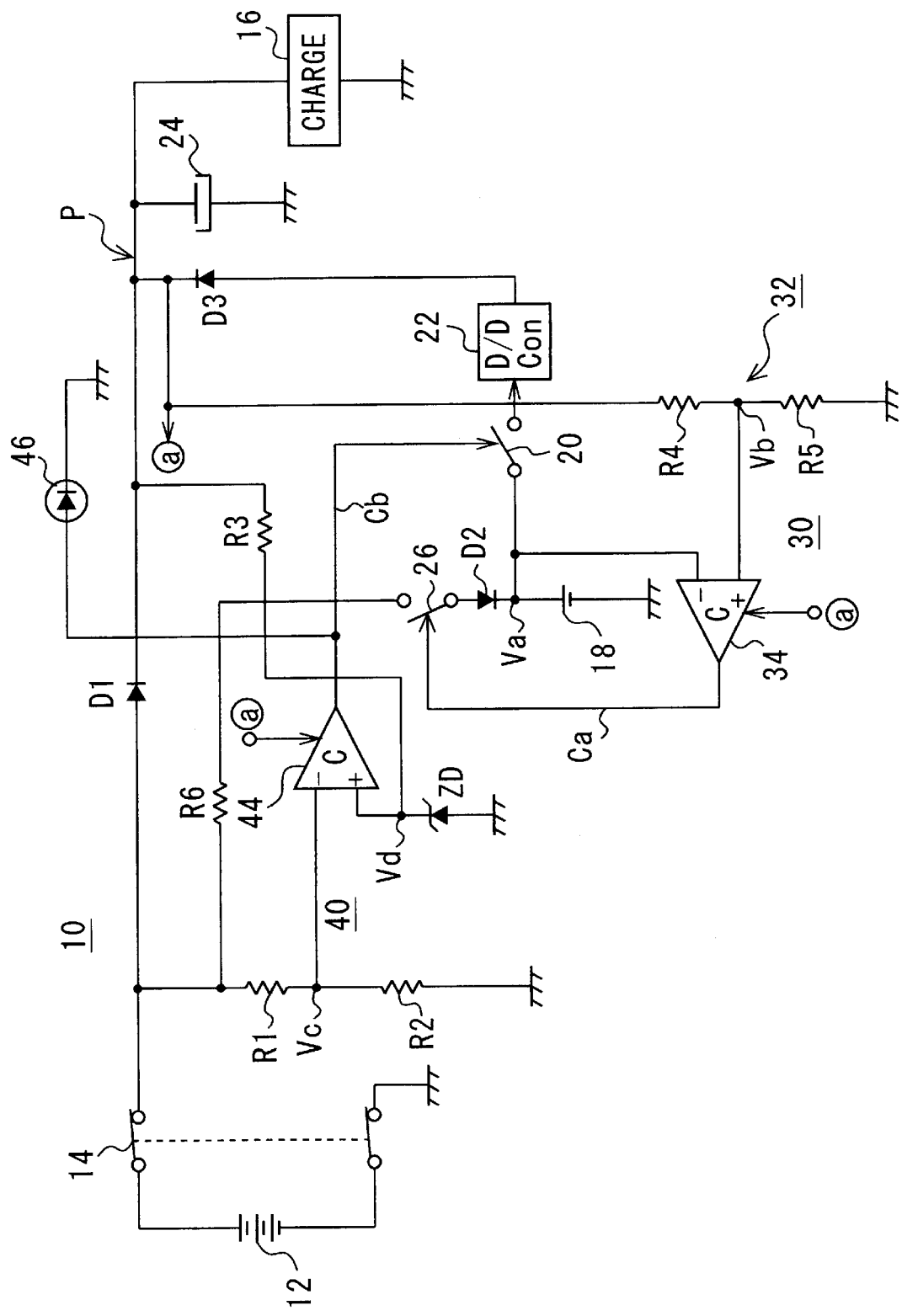
FIG. 2 is a connection diagram when a power circuit according to the present invention is applied to a power circuit of a notebook type personal computer, and is a view showing a normal operation state.

FIG. 1 shows one embodiment of a power circuit 10 of a terminal device according to the present invention. An external battery 12 that functions as a first battery is connected to a charge (a personal computer main frame that consists of a central processing unit, CPU) 16 via a power switch 14 provided at a terminal device. A built-in battery 18 that functions as a secondary battery as well is connected to the charge 16 via a changeover switch 20 and a voltage increase circuit, for example, a DC—DC converter 22.

A primary battery or a secondary battery is used as an external battery 12. A battery whose battery capacity is not so large can be used in order to reduce the weight of a terminal device. A terminal voltage of about 10 to 16 volts is used. As a built-in battery 18, a small secondary battery with its small battery capacity such as lithium ion battery is used. Its terminal voltage is set to about 3.6 bolts. In this situation, the charge 16 cannot be driven, and thus, a voltage-increase DC—DC converter 22 is provided as shown in the figure. By means of this DC—DC converter 22, its output voltage is increased to a voltage (about 10 to 16 volts) which is sufficient to drive the charge 16.

A diode D1 connected to a power supply path of the external battery 12 is a back flow prevention element for preventing back-flow of the current from the built-in battery 18. Similarly, a diode D3 connected to a power supply path of the built-in battery 18 is a back-flow prevention element for preventing back-flow of a current from the external battery 12. In addition, a capacitor 24 connected to a connection point (connection terminal) "p" of the charge 16 is an element for absorbing a voltage fluctuation when a battery is switched, and is used as a power supply of the charge 16.

The built-in battery 18 is charged by means of the external battery 12. Therefore, a battery voltage (terminal voltage) via the power switch 14 is applied to the built-in battery 18 via the charge path that consists of a resistor R6 and a back-flow inhibiting diode D2. A second switch 26 is connected to this charge path.

Opening/closing of the second switch 26 is controlled by means of an output of an overcharge prevention means 30. The overcharge prevention means 30, as illustrated, comprises a voltage divider circuit 32 composed of a pair of resistors R4 and R5 and a voltage comparator 34 for defining a voltage dividing output of the voltage divider circuit 32 as a reference voltage Vb and comparing a terminal voltage Va of the built-in battery 18 with the reference voltage. Then, opening/closing of the second switch 26 is controlled by means of an output Ca of the voltage comparator 34.

Next, opening/closing of a first changeover switch 20 is controlled by means of an output Cb of the voltage detection means 40 of the external battery 12. The voltage detection means 40 comprises: a voltage dividing circuit 42 composed of a pair of resistors R1 and R2; and a voltage comparator 44. A voltage dividing output Vc of the voltage divider circuit 42 and a reference voltage Vd are supplied respectively to the voltage comparator 44. Therefore, a Zener diode ZD is connected to a charge terminal "p" via a resistor R3, and a terminal voltage of this Zener diode ZD is used as a reference voltage Vb.

The opening/closing state of the second changeover switch 20 is controlled by means of the output Cb of the voltage comparator 44, and this output Cb is utilized as a drive voltage of a display element 46 such as LED. The display element 46 is used for prompting battery replacement. Thus, the display element is arranged to be lit when a voltage of the external battery 12 is lowered to a predetermined voltage or less.

Now, an operation of the thus arranged power circuit 10 will be described here. In initial states of the first and second changeover switches 20 and 26, as shown in FIG. 1, assume that the first changeover switch 20 is opened (OFF), and the second changeover switch 26 is closed (ON).

[(1) Operation for Completion of Charging of Built-In Battery 18 after Mounting External Battery 12]

A power switch 14 is turned ON, whereby a predetermined drive voltage is applied from the external battery 12 to the charge 16, and the charge 16 can be normally driven by means of the external battery 12.

In this initial mode, a voltage of a connection point "p" is a terminal voltage of the external battery 12, and the built-in battery 18 is not charged. Thus, when Va=0, a relationship of input voltages of the voltage comparator 34 is obtained as Vb>Va. At this time, at an output (for example, a positive voltage (high level)) Ca of the voltage comparator 34, the second changeover switch 26 maintains its closed state.

Therefore, at the initial state after power has been supplied, the built-in battery 18 is charged by means of the external battery 12 via a charge path of the resistor R6 and diode D2. When charging completes, the charge voltage Va of the built-in battery 18 is initially set so as to be equal to or higher than the dividing voltage Vb. Thus, an output Ca of the voltage comparator 34 is inverted into a low level at the same time when charging is completed.

The second changeover switch 26 is controlled to be opened (OFF) by inversion of the output Ca, and charging from the external battery 12 terminates. At the same time, when this charging completes, a charge path for the second battery 18 is cut off, and thus, the built-in battery 18 never enters an over charge state. Namely, the overcharge prevention means 30 is provided, whereby overcharge of the built-in battery 18 can be reliably prevented.

[(2) Operation When Terminal Voltage of External Battery 12 is Equal to or Greater than a Predetermined Voltage]

When the terminal voltage of the external battery 12 is equal to or greater than a predetermined voltage, its terminal voltage is applied to the charge 16, and thus, the charge 16 can be normally driven.

In addition, in the above described voltage detection means 40, a relationship between the reference voltage Vd obtained when the terminal voltage of the external battery 12 is applied and the dividing voltage Vc is selected to be Vd>Vc, when such a voltage relationship is established, the first changeover switch 20 is selected to maintain a closed state (OFF), as shown in the figure, by means of an output (for example, low level) Cb from the voltage comparator 44. Therefore, the charge 16 is driven by the external battery 12 only. Of course, at this time, the display element 46 is not lit by the output Cb.

[(3) Operation when External Battery 12 is set to a Predetermined Terminal Voltage or Less]

If the external battery 12 is long used, its terminal voltage gradually lowers. The value of the dividing voltage Vc lowers as well in accordance with the lowering of the terminal voltage. In contrast, the value of the reference voltage Vd is constant due to action of the Zener diode ZD even if the voltage of the connection point P lowers. Therefore, an input voltage relationship in voltage comparator 44 is finally established as a voltage relationship of Vd≦Vc. In this way, if the dividing voltage Vc is equal to or smaller than the reference voltage Vd, the output Cb obtained from the voltage comparator 44 as well is inverted, and enters a high level.

Figure 3:
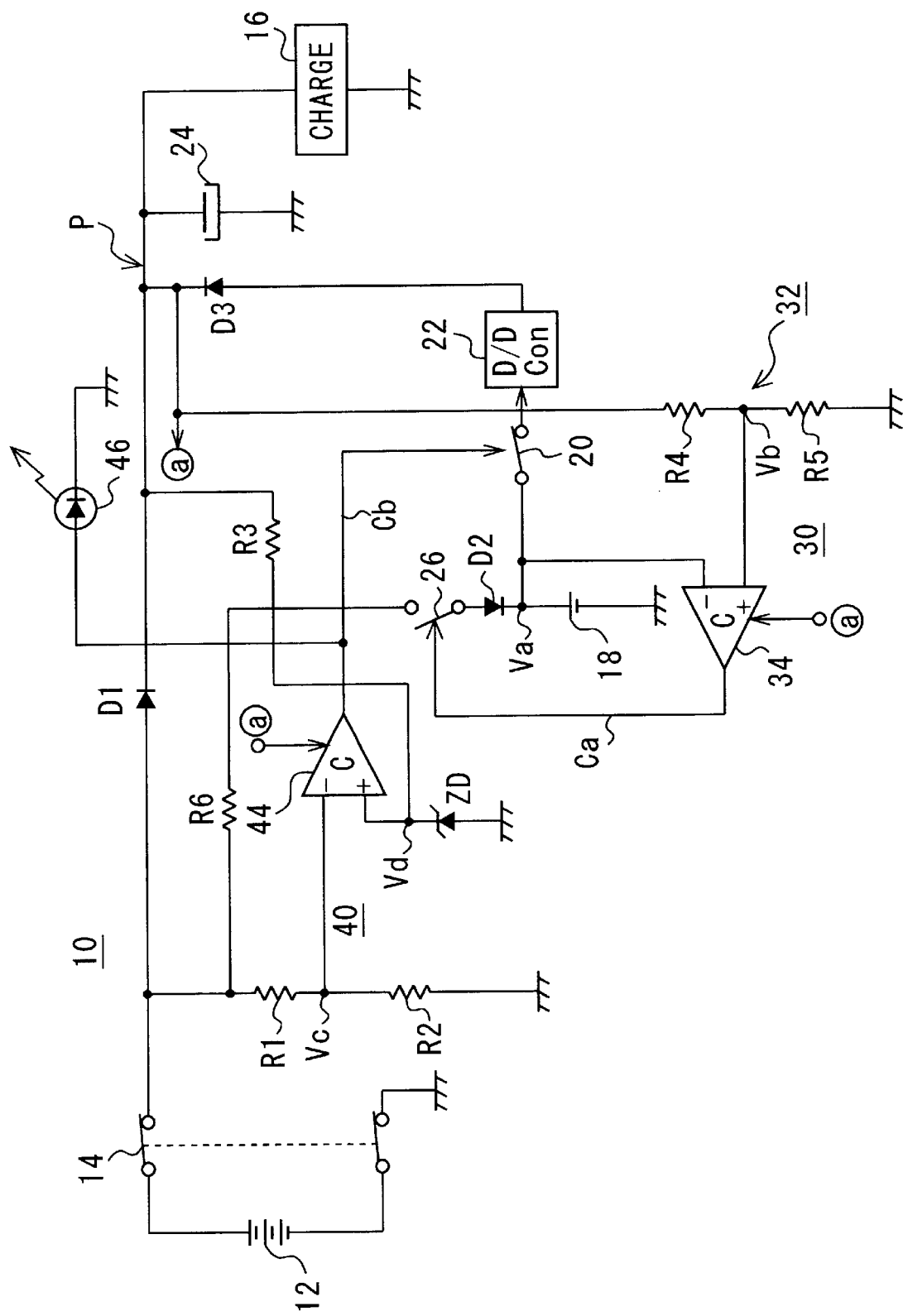
FIG. 3 is a connection diagram when a power circuit according to the present invention is applied to a power circuit of a notebook type personal computer, and is a view showing an operation state during battery replacement.

When the output Cb is inverted, the display terminal 46 is lit by the voltage (output Cb) applied to the display element 46, and prompts the user to replace the external battery 12. In addition, due to inversion of this output Cb, the first changeover switch 20 is switched to a closed state, as shown in FIG. 3.

At this time, the voltage of the built-in battery 18 is first increased by means of the DC—DC converter 22, and the increased voltage is applied to the charge 16 via the diode D3. Namely, the voltage of the built-in battery 18 is applied as a drive voltage so as to supplement the voltage fall of the external battery 12, whereby the operation state is continuously maintained without interruption of such operation.

By an alarm display, a user can recognize that the terminal voltage of the external battery 12 has been lowering down to a voltage at which the charge 16 can not be continuously driven. Thus, the external battery 12 is replaced with the replacement battery by means of an alarming. Therefore, by replacing the external battery 12 immediately after alarming has started, the external battery 12 can be replaced with a new external battery hand held as a reserved battery while maintaining the operation state of the charge 16.

From the foregoing, the built-in battery 18 may have a battery capacity such that the charge 16 can be driven by a time for replacing the external battery 12 (30 to 60 seconds), and thus, a battery which is small both in size and capacity (such as above lithium ion battery) can be used for the built-in battery 18.

When a new external battery 12 is mounted, a usual high terminal voltage is obtained, whereby a potential relationship is reversed again like Vc>Vd. By this reversal, the voltage level of the output Cb as well is inverted, whereby the first changeover switch 20 is controlled to its original closed state. By this switching control, only the external battery 12 is supplied as its drive voltage to the charge 16, and is restored to its normal state. In addition, the display element 46 as well goes out due to replacement of the external battery 12.

In a case of using a notebook type personal computer as an electronic device, when communication with an external device is conducted by means of the notebook type personal computer connected with public phone lines, the built-in battery 18 can drive the computer continuously despite the alarm display of battery replacement, which enables replacement of the external battery 12 with the telecommunication lines connected with the external device.

In a normal state, when the terminal voltage Va of the built-in battery 18 is set to the reference voltage Vb or less, it is evident that the second changeover switch 26 is closed, charging is started, and the second changeover switch 26 is controlled again to a closed state upon completion of charging.

Although not shown, the built-in battery 18 can be used as a backup battery for a memory means (semiconductor memory such as RAM) incorporated in the device main frame. In this case, one terminal voltage of the built-in battery itself or adjusted voltage is directly supplied to the memory means, whereby the storage contents of the memory means can be backed up.

In the above described embodiment, although the present invention is applied to a power circuit of a terminal device such as notebook type personal computer, the present invention is also applicable to a power circuit of other electronic devices such as a device that can be driven by a battery.

As has been described above, in the present invention, a built-in battery that is a secondary battery capable of driving a charge is provided. When a terminal voltage of an external battery that is a first battery has lowered, the charge can be driven by means of the built-in battery in place of the external battery.

According to the present invention, even while an external battery is replaced, a charge can be driven by means of a built-in battery, and thus, a charge operation state can be maintained. Thus, an operation state before replacement of the external battery can be continuously maintained as is, for example, even when communication with an external device such as notebook type personal computer is made, the external battery can be replaced without cutting off the state of the communication with the external device. Therefore, there is no need to restart immediate preceding operation mode after replacement of the external battery.

A built-in battery may drive a charge for a short period of time to replace the external battery, and thus, there is no need to provide a built-in battery with its large capacity. Therefore, a small sized, small capacity battery can be used. Of course, in the case where this built-in battery is used as a buffer amplifier of a memory means incorporated in the device, there is an advantage that the number of parts can be reduced concurrently.

Therefore, a power circuit according to the present invention is very preferable by applying it to a power circuit of a battery driven, small sized electronic device.

What is claimed is:

1. A power circuit comprising:
    a first battery for driving a charge;
    a second battery for driving the charge in place of the first battery;
    a voltage detection means for detecting a terminal voltage of the first battery;
    a first switch for controlling a power supply path of the second battery based on an output of the voltage detection means;
    an overcharge prevention means for preventing an overcharge for the second battery caused by the first battery; and
    a second switch connected to a charge path for the second battery and controlled by the output of the overcharge prevention means, said power circuit characterized in that, when the first battery is lowered to a predetermined voltage or less, the charge is driven by means of the second battery.

2. A power circuit as claimed in claim 1, characterized in that the voltage detection means comprises: a voltage divider circuit for dividing a voltage of the first battery; and a voltage comparator in which a voltage dividing output of the voltage divider circuit and a reference voltage obtained by the charge side are supplied.

3. A power circuit as claimed in claim 2, characterized in that a display element prompting battery replacement is connected to an output stage of the voltage comparator, and, when the voltage of the first battery is lowered to the predetermined voltage or less, the display element is lit.

4. A power circuit as claimed in claim 1, characterized in that an overcharge prevention means comprises: a voltage divider circuit for dividing a drive voltage supplied from the charge side; and a voltage comparator for comparing a terminal voltage of the second battery.

5. A power circuit as claimed in claim 1, characterized in that a voltage increase DC—DC converter is connected onto a power supply path of the second battery.

6. A power circuit as claimed in claim 2, characterized in that the overcharge prevention means comprises: a voltage divider circuit for dividing a drive voltage supplied from the charge side; and a voltage comparator for comparing a terminal voltage of the second battery when a voltage dividing output of the voltage divider circuit is defined as a reference voltage.

7. A power circuit as claimed in claim 6, characterized in that a pressure increase DC—DC converter is connected onto a power supply path of the second battery.

8. A power circuit as claimed in claim 7, characterized in that a display element prompting battery replacement is connected to an output stage of the voltage comparator, and, when a voltage of the first battery is lowered to a predetermined voltage or less, the display element is lit.

9. A power supply method comprising:
   a voltage detection step of detecting a terminal voltage of a first battery for driving a charge;
   a step of controlling a first switch connected to a power supply path of a second battery for driving the charge in place of the first battery based on the result of the voltage detection step;
   an overcharge prevention step of preventing an overcharge for the second battery caused by the first battery; and
   a step of controlling a second switch for preventing an overcharge connected to a charge path for the second battery based on the result of the overcharge preventing step, said power supply method characterized in that, when the first battery is lowered to a predetermined voltage or less, the charge is driven by the second battery.

10. A power supply method as claimed in claim 9, characterized in that the voltage detection step compares a voltage dividing output having divided thereby a voltage of the first battery with a reference voltage obtained by the charge side.

11. A power supply method as claimed in claim 10, characterized in that, when a voltage of the first battery is lowered to a predetermined voltage or less, a display element is lit.

12. A power supply method as claimed in claim 9, characterized in that the overcharge prevention step defines a voltage dividing output having divided thereby a drive voltage supplied from the charge side, and compares the reference voltage with a terminal voltage of the second battery.

13. A power supply method as claimed in claim 9, characterized by further comprising the step of increasing a terminal voltage of the second battery.

14. A power supply method as claimed in claim 10, characterized in that the overcharge prevention step defines a voltage dividing output having divided thereby a drive voltage supplied from the charge side, and compares the reference voltage with a terminal voltage of the second battery.

15. A power supply method as claimed in claim 14, characterized by further comprising the step of increasing a terminal voltage of the second battery.

16. A power supply method as claimed in claim 15, characterized in that, when a voltage of the first battery is lowered to a predetermined voltage or less, a display element is lit.

17. An electronic device comprising:
   a first battery for driving a charge;
   a second battery for driving the charge in place of the first battery;
   a voltage detection means for detecting a terminal voltage of the first battery;
   a first switch for controlling a power supply path of the second battery based on an output of the voltage detection means;
   an overcharge prevention means for preventing an overcharge for the second battery caused by the first battery; and
   a second switch connected to a charge path for the second battery and controlled by the output of the overcharge prevention means, said power circuit characterized in that, when the first battery is lowered to a predetermined voltage or less, the charge is driven by means of the second battery.

18. An electronic device as claimed in claim 17, characterized in that the electronic device is a hand held electronic device.

19. An electronic device as claimed in claim 18, characterized in that the electronic device is a hand held telephone set.

20. An electronic device as claimed in claim 18, characterized in that the hand held electronic device is a hand held personal computer.

21. An electronic device as claimed in claim 18, characterized in that the hand held electronic device is a hand held digital camera.

22. An electronic device as claimed in claim 18, characterized in that the hand held electronic device is a hand held game device.

* * * * *